US012757138B2

(12) United States Patent
Bandi et al.

(10) Patent No.: US 12,757,138 B2
(45) Date of Patent: Oct. 6, 2026

(54) MONITORING, DETECTING, ESTIMATING, AND ALERTING THE CV2X-PC5 OPERATION STATUS

(71) Applicant: Ford Global Technologies, LLC, Dearborn, MI (US)

(72) Inventors: Krishna Bandi, Novi, MI (US); Ivan Vukovic, Birmingham, MI (US); Bryan Michael Bolger, Canton, MI (US); Sathyanarayana Chary Palakonda, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 18/582,040

(22) Filed: Feb. 20, 2024

(65) Prior Publication Data

US 2025/0267599 A1 Aug. 21, 2025

(51) Int. Cl.
*H04W 56/00* (2009.01)
*H04W 4/40* (2018.01)
*H04W 92/18* (2009.01)

(52) U.S. Cl.
CPC ......... *H04W 56/0015* (2013.01); *H04W 4/40* (2018.02); *H04W 92/18* (2013.01)

(58) Field of Classification Search
CPC ... H04W 4/40; H04W 24/08; H04W 56/0015; H04W 56/001; H04W 92/18
See application file for complete search history.

(56) References Cited

U.S. PATENT DOCUMENTS

| | | | | |
|---|---|---|---|---|
| 10,405,161 | B2 | 9/2019 | Mishra et al. | |
| 2014/0355628 | A1* | 12/2014 | Akhlaq ............... | H04W 56/001 370/509 |
| 2016/0095075 | A1* | 3/2016 | Bin Sediq ........... | H04W 56/001 370/350 |
| 2018/0124771 | A1* | 5/2018 | Mok ....................... | H04W 4/06 |
| 2019/0098589 | A1* | 3/2019 | Chae ................... | H04W 56/001 |
| 2020/0120625 | A1 | 4/2020 | Park et al. | |
| 2020/0359354 | A1* | 11/2020 | Lee ......................... | G01S 11/02 |
| 2021/0021376 | A1* | 1/2021 | Srivastava ............ | H04L 1/0091 |
| 2021/0029761 | A1 | 1/2021 | Jung et al. | |
| 2021/0068120 | A1 | 3/2021 | Jung et al. | |

(Continued)

FOREIGN PATENT DOCUMENTS

| | | | |
|---|---|---|---|
| CN | 104349449 | A | 2/2015 |
| WO | 2021015345 | A1 | 1/2021 |
| WO | 2021146945 | A1 | 7/2021 |

*Primary Examiner* — Bailor C Hsu
(74) *Attorney, Agent, or Firm* — Joseph Zane; Brooks Kushman P.C.

(57) ABSTRACT

Monitoring, detecting, estimating, and alerting of cellular vehicle-to-everything PC5 (CV2X-PC5) operation status of a vehicle is performed. Inputs indicative of message timing of messages over CV2X-PC5 are received, the messages being used for one or more subscribed vehicle features. Time synchronization of the received inputs is monitored. It is determined whether a synchronization issue is detected, including to perform regression estimation for early prediction of potential time synchronization issues. Responsive to occurrence of the synchronization issue, an alternate wireless communication medium of the vehicle is used to mitigate effects of the synchronization issue on the one or more subscribed vehicle features.

20 Claims, 5 Drawing Sheets

(56) References Cited

U.S. PATENT DOCUMENTS

| | | | |
|---|---|---|---|
| 2021/0243837 | A1 | 8/2021 | Jung et al. |
| 2021/0272394 | A1* | 9/2021 | Cella ...................... G06Q 40/08 |
| 2021/0306243 | A1* | 9/2021 | Mori ....................... G01S 19/48 |
| 2021/0385865 | A1 | 12/2021 | Mueck et al. |
| 2022/0053436 | A1 | 2/2022 | Sosnin et al. |
| 2022/0123849 | A1 | 4/2022 | McCall et al. |
| 2022/0345417 | A1 | 10/2022 | Kasichainula et al. |
| 2022/0388505 | A1 | 12/2022 | Sharma Banjade et al. |
| 2023/0184870 | A1 | 6/2023 | Shuman et al. |
| 2023/0239102 | A1 | 7/2023 | Ben-Ari et al. |
| 2023/0254786 | A1* | 8/2023 | Das ..................... H04W 56/001 370/350 |
| 2023/0421253 | A1* | 12/2023 | Palermo ............. H04B 7/18591 |
| 2024/0297726 | A1* | 9/2024 | Kung .................... H04J 3/0623 |

* cited by examiner

MONITORING, DETECTING, ESTIMATING, AND ALERTING THE CV2X-PC5 OPERATION STATUS

TECHNICAL FIELD

Aspects of the disclosure generally relate to monitoring, detecting, estimating, and alerting cellular vehicle-to-everything PC5 (CV2X-PC5) operation status.

BACKGROUND

Vehicle-to-everything (V2X) is a type of communication that allows vehicles to communicate with various aspects of the traffic environment. This communication may include interacting with vehicles using vehicle-to-vehicle (V2V) communication and interacting with infrastructure using vehicle-to-infrastructure (V2I) communication. PC5 is a standard for V2X technology that involves device-to-device communication over the 5.9 GHz band.

Vehicles may include radio transceivers and vehicle on-board units (OBUs) to facilitate V2X communications. Road-side units (RSUs) may provide wireless communications from roadside infrastructure to the OBUs. Such communication may be referred to as infrastructure-to-vehicle (I2V) communication. RSUs generally operate in the same frequency band as V2X, over technologies such as Cellular Vehicle-to-Everything (CV2X) and Dedicated Short Range Communications (DSRC) technologies. Some RSUs provide additional functionality, such as local Wi-Fi hotspots for pedestrians or cellular backhaul to communicate information with a central system.

SUMMARY

In one or more illustrative examples, a method for monitoring cellular vehicle-to-everything PC5 (CV2X-PC5) operation status of a vehicle, comprising receiving inputs indicative of message timing of messages over CV2X-PC5, the messages being used for one or more subscribed vehicle features; monitoring time synchronization of the received inputs; determining whether a synchronization issue is detected, including performing regression estimation for early prediction of potential time synchronization issues; and responsive to occurrence of the synchronization issue, utilizing an alternate wireless communication medium of the vehicle to mitigate effects of the synchronization issue on the one or more subscribed vehicle features.

In one more illustrative examples, a system for monitoring, detecting, estimating, and alerting cellular vehicle-to-everything PC5 (CV2X-PC5) operation status of a vehicle includes one or more computing devices configured to receive inputs indicative of message timing of messages over CV2X-PC5, the messages being used for one or more subscribed vehicle features; monitor time synchronization of the received inputs; determine whether a synchronization issue is detected, including performing regression estimation for early prediction of potential time synchronization issues; and responsive to occurrence of the synchronization issue, utilize an alternate wireless communication medium of the vehicle to mitigate effects of the synchronization issue on the one or more subscribed vehicle features.

In one more illustrative examples, a non-transitory computer-readable medium comprising instructions for monitoring, detecting, estimating, and alerting cellular vehicle-to-everything PC5 (CV2X-PC5) operation status of a vehicle that, when executed by one or more computing devices of the vehicle, cause the vehicle to perform operations including to receive inputs indicative of message timing of messages over CV2X-PC5, the messages being used for one or more subscribed vehicle features; monitor time synchronization of the received inputs; determine whether a synchronization issue is detected, including performing regression estimation for early prediction of potential time synchronization issues; and responsive to occurrence of the synchronization issue, utilize an alternate wireless communication medium of the vehicle to mitigate effects of the synchronization issue on the one or more subscribed vehicle features.

DETAILED DESCRIPTION

Figure 1:
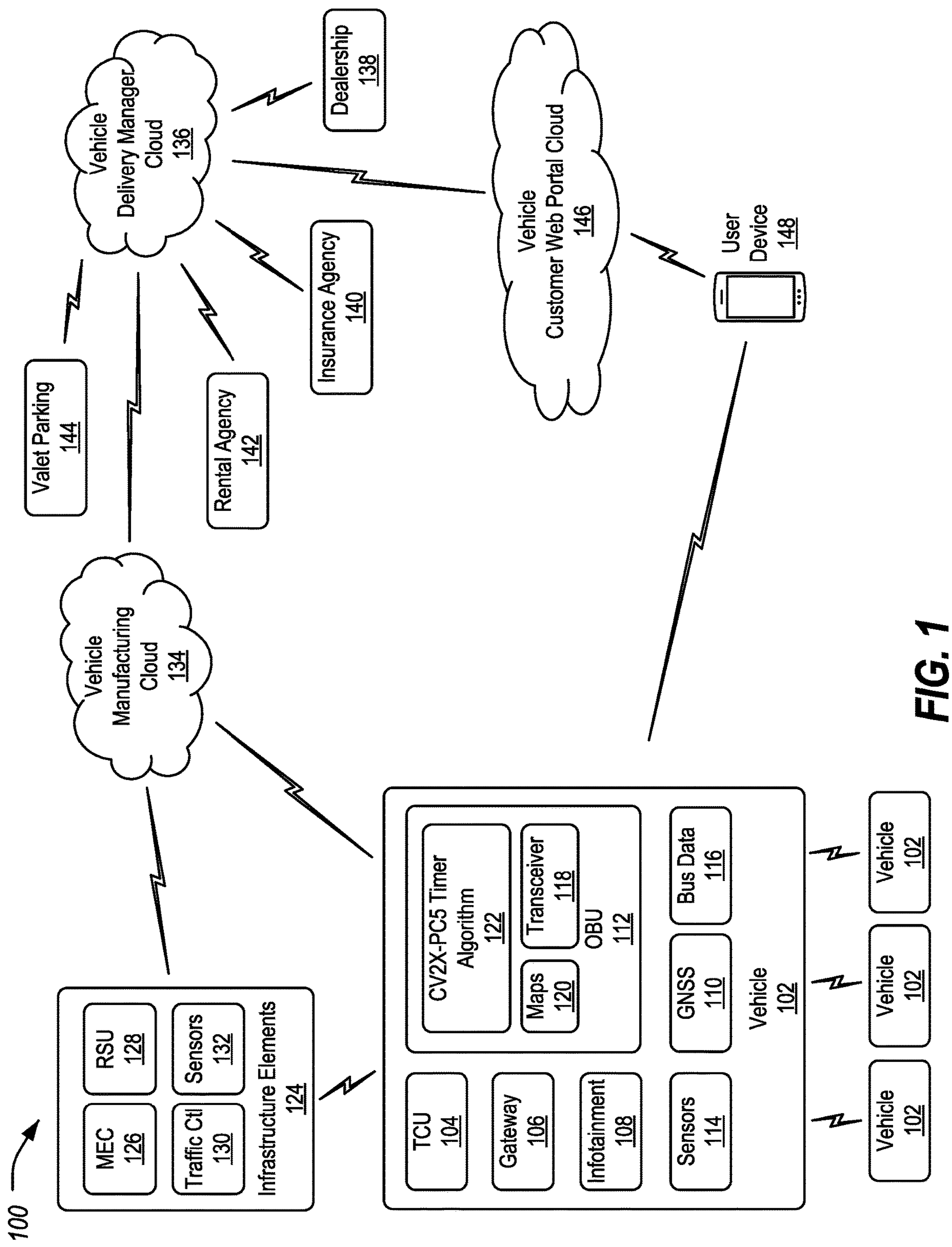
FIG. 1 illustrates an example system supporting the operation of the CV2X-PC5 timer approach.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

CV2X PC5 technology is a synchronous system. This means that CV2X-PC5 relies on precise timing for transmission and reception of over-the-air (OTA) packets. The time synchronization required for CV2X-PC5 operation may include that CV2X device timing should be within ±12 Ts (391 ns) of global navigation satellite system (GNSS) time. The frequency stability for CV2X-PC5 operation may include that the CV2X device is required to maintain its carrier frequency within ±0.1 parts per million (PPM) over 1 time slot (e.g., 0.5 milliseconds) compared to the absolute frequency. 391 ns is an allowed timing error for certain transmissions. It should ne noted that this is only one example, and other timing thresholds to be considered synchronized may be used.

Various approaches may be used to determine and maintain timing for CV2X-PC5 operation. In an example, GNSS signals from satellites may be used due to their increased time accuracy compared to signals from repeaters or simulators. In another example, sidelink synchronization signals (SLSS) may be used on the PHY layer and/or master information block messaging on the radio link control (RLC) sublayer to achieve time and frequency synchronization. Nevertheless, it may be challenging to identify or predict a transition between GNSS or SLSS time synchronization loss early enough in time to trigger a corrective action.

It may also be difficult for applications that use CV2X-PC5 features to understand a reason behind a potential loss or pause of CV2X-PC5 communications resulting from time drift, which also affects overall CV2X-PC5 feature performance. Despite this, multiple applications that use CV2X-PC5 features may be reliant on synchronized CV2X-PC5 timing, including various V2V applications, V2I/I2V applications, vehicle to pedestrian (V2P) applications, and vehicle to network (V2N) applications. The loss of time synchronization may also affect CV2X-PC5 wireless communication radio frequency (RF) performance metrics.

Aspects of the disclosure relate to predicting loss of time synchronization to address the potential effect on transmission and reception of any CV2X-PC5 messages from and to the vehicle, such that various features of the vehicle can could convey information to vehicle customers via the human-machine interface (HMI) and other alternative wireless communications media. The approach may be used to perform monitoring, detecting, estimating, and alerting of CV2X-PC5 operation status using a CV2X-PC5 timer approach.

The CV2X-PC5 timer approach may receive inputs including a CV2X-PC5 status (e.g., indicative of the state CV2X-PC5 component of the vehicle), GNSS of the vehicle (e.g., semi major axis accuracy, semi minor axis accuracy, time confidence, number of satellites available, number of satellites being used, etc.), time uncertainty (e.g., from received and transmitted CV2X-PC5 messages), vehicle system clock (e.g., system clock time, clock drift time, gPTP reported values, etc.), SLSS messages (e.g., reception of the SLSS message from one or more CV2X-PC5 RSUs), data from vehicle sensors (e.g., cameras, light detection and ranging (LIDAR), etc.), data from CV2X-PC5 messages (e.g., inter packet gap (IPG), packet error rate (PER), received signal strength indicator (RSSI), etc.).

Based on the inputs, the CV2X-PC5 timer approach may serve as a platform feature supporting timing for the various vehicle CV2X-PC5 features. The approach may include monitoring the inputs via both dynamic and static data rate intervals using a feedback loop system. Based on the data received, the approach may detect whether time synchronization over a defined threshold of samples falls below the 391 ns threshold as noted above, or whether the time synchronization begins to drifting closer to the 391 ns threshold and beyond via predefined conditions. Based on the detecting of such a condition for a predefined duration, the CV2X-PC5 feature may perform regression estimation training instantaneously for early prediction of potential time synchronization issues. If an issue is identified, the approach may alert any CV2X-PC5 features subscribed to this CV2X-PC5 timer feature output.

Based on the output, the CV2X-PC5 timer approach may aid the CV2X-PC5 features in providing alerts and/or initiation of alternate wireless communication to allow the CV2X-PC5 features to continue despite the lack of synchronization. The subscribed CV2X-PC5 features may use the alerts trigger to plan ahead for a potential loss of CV2X-PC5 messaging and/or to inform the vehicle customer of the respective feature of the potential feature unavailability. The alerting may also trigger and display a CV2X-PC5 wireless connectivity status on the vehicle HMI. The algorithm could also differentiate the GNSS reception received over repeaters vs real satellites and may inform the respective CV2X-PC5 features of repeater-specific potential synchronization issues. Further aspects of the disclosure are discussed in detail below.

FIG. 1 illustrates an example system 100 supporting the operation of the CV2X-PC5 timer approach. As shown, the system 100 includes one or more vehicles 102. Each vehicle 102 may include various controllers, such as a telematics control unit (TCU) 104, a gateway controller 106, an infotainment controller 108, a GNSS controller 110, and an OBU 112. The vehicle 102 may also include various vehicle sensors 114. These components of the vehicle 102 may communicate over one or more buses, which may allow the OBU 112 to receive bus data 116 descriptive of the operation of the vehicle 102 components. This may include inputs from the TCU 104, the gateway controller 106, the infotainment controller 108, the GNSS controller 110, the vehicle sensors 114, as well as from other controllers that are not shown in FIG. 1. The OBU 112 may include a transceiver 118 and may maintain data such as maps 120 and a CV2X-PC5 timer algorithm 122. The system 100 may also include various infrastructure elements 124 in communication with the vehicle 102. These may include, for example, multi-access edge computing (MEC) 126 devices, RSUs 128, traffic controls 130, and infrastructure sensors 132. The system 100 may include additional components in communication with the vehicles 102 and infrastructure elements 124. For example, a vehicle manufacturing cloud 134 of a manufacturing plant that builds the vehicles 102 may be in wireless communication with the vehicles 102 and infrastructure elements 124. In turn, the vehicle manufacturing cloud 134 may be in wireless communication with a vehicle delivery manager cloud 136. The vehicle delivery manager cloud 136 may be in communication with various entities configured to provide services to the vehicles 102. These entities may include, for example, dealerships 138, insurance agencies 140, rental agencies 142, and valet parking 144. The system 100 may also include a vehicle customer web portal cloud 146, in communication with the vehicle delivery manager cloud 136 and a user device 148 of a pedestrian or vehicle 102 user. The user device 148 may also be configured to communicate with the vehicles 102 to provide various V2P services to the pedestrian. It should be noted that the components of the system 100 are merely an example. Other systems 100 may include more, fewer, or differently located components.

The vehicle 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle, a parallel hybrid electric vehicle, or a parallel/series hybrid electric vehicle. As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The TCU 104 may include network hardware configured to facilitate communication between the vehicle 102 and with other devices of the system 100. The TCU 104 may include various types of computing apparatus in support of performance of the functions of the TCU 104 described herein. In an example, the TCU 104 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

The gateway controller 106 may be configured to provide an electrical interface between the vehicle buses used to communicate within the vehicle 102. In an example, the gateway controller 106 may be configured to route signals from one vehicle bus to another vehicle bus within the vehicle 102. The gateway controller 106 may accordingly allow the different components of the vehicle 102 to communicate, despite the components being connected to in different ways and to different buses.

The infotainment controller 108 may be configured to provide an HMI to various services to the occupants of the vehicle 102. These services may include, for example, eCall, turn-by-turn navigation, media playback, etc. The HMI may include various screens, touchscreens, speakers, microphones, etc., serving to allow information to be received from the occupants as well as provided to the occupants.

The GNSS controller 110 may allow the vehicle 102 to implement autonomous geo-spatial positioning for the vehicle 102. As some examples, the GNSS controller 110 functionality may allow the vehicle 102 to determine its position using one or more satellite networks, such as global positioning system (GPS), GLONASS, Galileo, Beidou and/or others.

The OBU 112 may be configured to provide telematics services to the vehicle 102. These services may include, as some non-limiting possibilities, navigation, turn-by-turn directions, vehicle health reports, local business search, accident reporting, and hands-free calling. The OBU 112 may be in communication with a transceiver 118. The OBU 112 may accordingly be configured to utilize the transceiver 118 to communicate over a cellular network over various protocols. For instance, the OBU 112 may access the cellular network via connection to one or more cellular towers. To facilitate the communications over the communications network, the OBU 112 may be associated with unique device identifiers (e.g., mobile device numbers (MDNs), Internet protocol (IP) addresses, etc.) to identify the communications of the OBU 112 on the communications network as being associated with the vehicle 102. The OBU 112 may, additionally, be configured to communicate over a broadcast peer-to-peer protocol (such as PC5), to facilitate V2X communications with devices such as the RSU 128. It should be noted that these protocols are merely examples, and different peer-to-peer and/or cellular technologies may be used.

The vehicle sensors 114 may be configured to receive information with respect to the surroundings of the vehicle 102. In an example, these vehicle sensors 114 may include one or more of cameras (e.g., advanced driver assistance system (ADAS) cameras), ultrasonic sensors, radio detection and ranging (RADAR) systems, and/or LIDAR systems.

The bus data 116 may include information transmitted across one or more buses of the vehicle 102. The vehicle buses may include various methods of communication available between the components of the vehicle 102. As some non-limiting examples, the vehicle buses may include one or more of a vehicle controller area networks (CAN), Ethernet networks, and/or media-oriented system transfer (MOST) networks.

The transceiver 118 may be configured to provide wireless communications services to the TCU 104. The TCU 104 may include or otherwise access a transceiver 118 configured to facilitate communication with other vehicles 102 or with the infrastructure elements 124. The TCU 104 may be further configured to communicate over various other protocols, such as with a communication network over a network protocol (such as Uu). The TCU 104 may, additionally, be configured to communicate over a broadcast peer-to-peer protocol (such as PC5), to facilitate CV2X communications with devices such as other vehicles 102. It should be noted that these protocols are merely examples, and different peer-to-peer and/or cellular technologies may be used.

The maps 120 may include information such as road segment shapes, road segment markings, locations of traffic controls 130 and barriers, and other information that may be useful for the vehicle 102 when traversing the roadway. The maps 120 may be constructed using data collected from the various vehicle sensors 114 and/or through use of arial imagery.

The CV2X-PC5 timer algorithm 122 may be configured to perform monitoring, detecting, estimating, and alerting functions with respect to cellular vehicle-to-everything PC5 operation status. Further aspects of the operation of the CV2X-PC5 timer algorithm 122 are discussed in detail with respect to FIG. 3.

The infrastructure elements 124 may include various hardware external to the vehicle 102 that is in communication with the vehicle 102. The infrastructure elements 124 may include elements that are in communication with the vehicle 102 during build (such as in a manufacturing facility), during service (such as at a dealership 138), and during travel (such as along a roadway or within a parking facility).

The MECs 126 may include various multi-access edge computing or mobile edge computing devices. The MECs 126 may include various hardware and software components to enable cloud computing capabilities for vehicles 102 or other infrastructure elements 124. The use of MECs 126 allows for the processing to be performed closer to the vehicles 102, as opposed to away from the vehicles 102 at a central cloud computing site.

The RSU 128 may be a device with processing capabilities and networking capabilities and may be designed to be placed in proximity of a roadway for use in communicating with vehicles 102. In an example, the RSU 128 may include hardware configured to communicate over the broadcast peer-to-peer protocol (such as PC5), to facilitate V2X communications with the vehicles 102. The RSU 128 may also have wired or wireless backhaul capability to allow for wired or wireless communication with other elements of the system 100.

The traffic controls 130 may include various devices such as traffic lights, stop signs, train crossings, warning signs, etc., that may monitor and facilitate the travel of vehicles 102 along the roadway.

The infrastructure sensors 132 may include various devices such as red light cameras, wireless toll gantries, parking meters, under-road traffic counter loops, etc., that use cameras, LIDAR, RADAR, electromagnetism, wireless backscatter, etc., to track the locations or other attributes of vehicles 102, pedestrians, or other traffic participants or obstructions.

The vehicle manufacturing cloud 134 may include various wired and/or wireless infrastructure installed to a manufacturing plant that builds the vehicles 102. This infrastructure may be in wireless communication with the vehicles 102 and/or the infrastructure elements 124, to provide information about the location, build status, or other aspects of the vehicles 102 during and after the build process but before transit and delivery.

The vehicle delivery manager cloud 136 may include various wired and/or wireless infrastructure configured to provide information about the location, status, or other aspects of the vehicles 102 after the build process and during the transit and delivery. The dealerships 138 may be configured to receive information from the vehicle delivery manager cloud 136. This may allow the dealerships 138 to receive the current transit status of ordered and/or vehicles 102 being built. The insurance agencies 140 may be configured to receive information from the vehicle delivery manager cloud 136. This may allow the insurance agencies 140 to update their records with respect to when vehicles 102 are available for being applied to insurance plans. The rental agencies 142 may be configured to receive information from the vehicle delivery manager cloud 136. This may allow the rental agencies 142 to update their records with respect to when vehicles 102 are available for rental. The valet parking 144 may be configured to receive information from the vehicle delivery manager cloud 136. This may allow the valet parking 144 to update their records with respect to which vehicles 102 are at what locations for parking and/or retrieval.

The vehicle customer web portal cloud 146 may include various wired and/or wireless infrastructure configured to provide services to the user devices 148 with respect to the vehicles 102 and/or with respect to the status information from the vehicle delivery manager cloud 136. In an example, the vehicle customer web portal cloud 146 may allow for the user to identify and/or update the build status, insurance status, parking status, insurance status, etc. of one or more vehicles 102.

Figure 2:
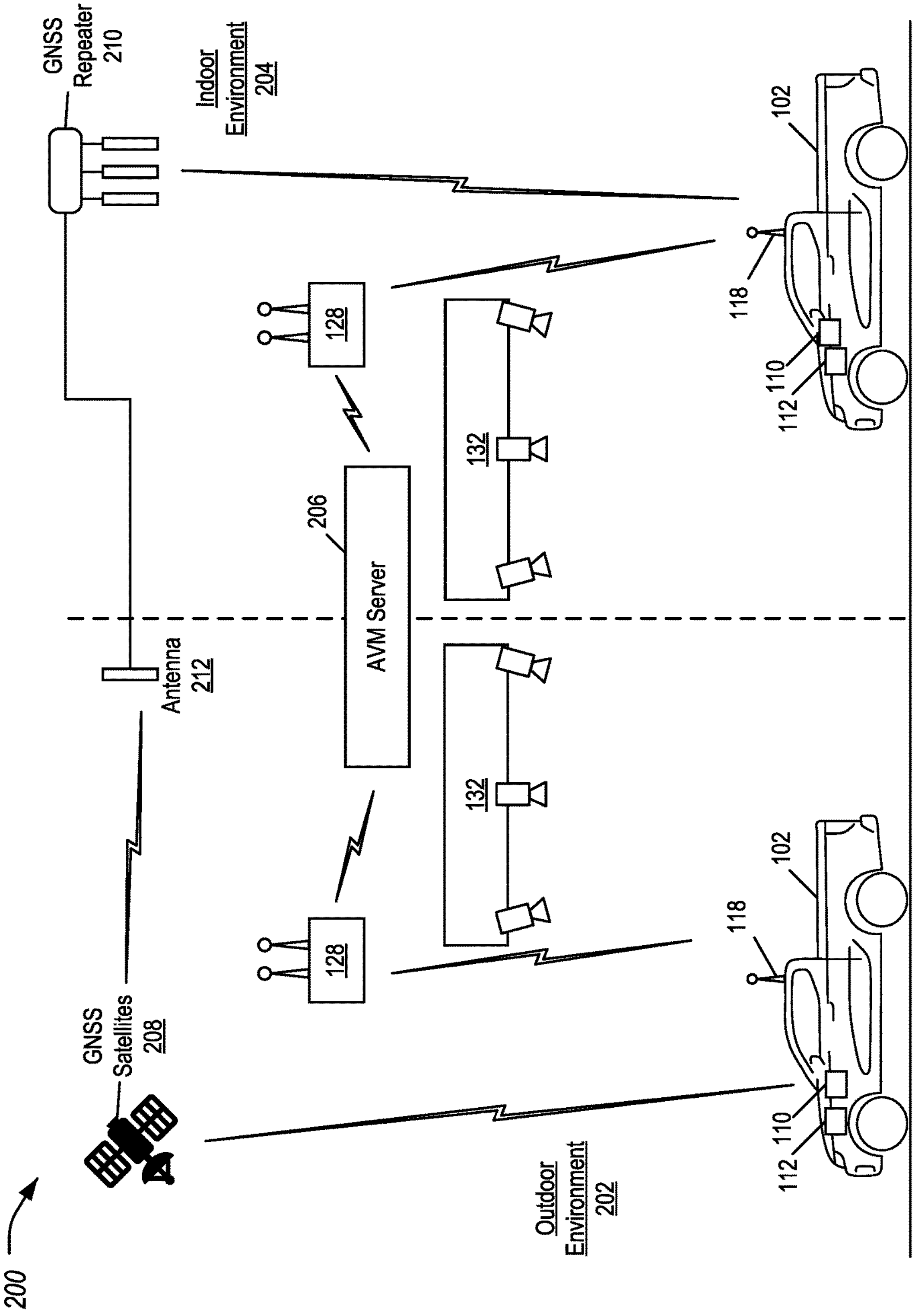
FIG. 2 illustrates an example of the vehicles in both an outdoor environment as well as an indoor environment.

FIG. 2 illustrates an example 200 of the vehicles 102 in both an outdoor environment 202 as well as an indoor environment 204. The outdoor environment 202 may include, for example, roadway or off-road trails. The indoor environment 204 may include, for example, factories, dealerships 138, service centers, parking garages, etc.

An automated vehicle marshalling (AVM) server 206 may be configured to monitor the vehicles 102, whether the vehicles 102 are in the outdoor environment 202 or the indoor environment 204. The AVM server 206 may be configured to perform GNSS-based location services for locating the vehicles 102, including providing a map of the locations of a plurality of vehicles 102 on a map. The AVM server 206 may also be configured to receive sensor data from the infrastructure sensors 132, to form a more complete view of the status of each of the vehicles 102 in addition to their locations.

When operating in the outdoor environment 202, the AVM server 206 may be configured to make use of a constellation of GNSS satellites 208 to facilitate the geolocation of the vehicles 102. This may be accomplished, for example, via the vehicles 102 using their GNSS controller 110 to locate themselves using the GNSS satellites 208 and sending that location information wirelessly via their OBUs 112 and transceivers 118 to RSUs 128 which are in communication with the AVM server 206.

When operating in the indoor environment 204, however, the vehicles 102 may make use of signals from GNSS repeaters 210. The GNSS repeaters 210 may receive signals from the constellation of GNSS satellites 208 via antennas 212 that are located within line of sight to the GNSS satellites 208. The GNSS repeaters 210 may use the antennas 212 to capture GNSS broadcasts and may rebroadcast those signals into the indoor environment 204. This allows the vehicles 102 to make use of location services when inside, that may not otherwise be possible due the constellation of GNSS satellites 208 not being visible by the vehicles 102 when they are located in the indoor environment 204. However, the repeater approach may reduce accuracy of the GNSS location when in the indoor environment 204.

The AVM server 206 may require precise CV2X-PC5 timing for transmission and reception of messages. However, it may be difficult for the AVM server 206 to understand a reason behind a potential loss or pause of CV2X-PC5 communications resulting from time drift, which also affects overall CV2X-PC5 feature performance. Despite this, multiple CV2X-PC5 applications may be reliant on synchronized CV2X-PC5 timing, including various V2V applications, V2I/I2V applications, vehicle-to-pedestrian (V2P) applications, and vehicle-to-network (V2N) applications. The loss of time synchronization may also affect CV2X-PC5 wireless communication radio frequency (RF) performance metrics.

Figure 3:
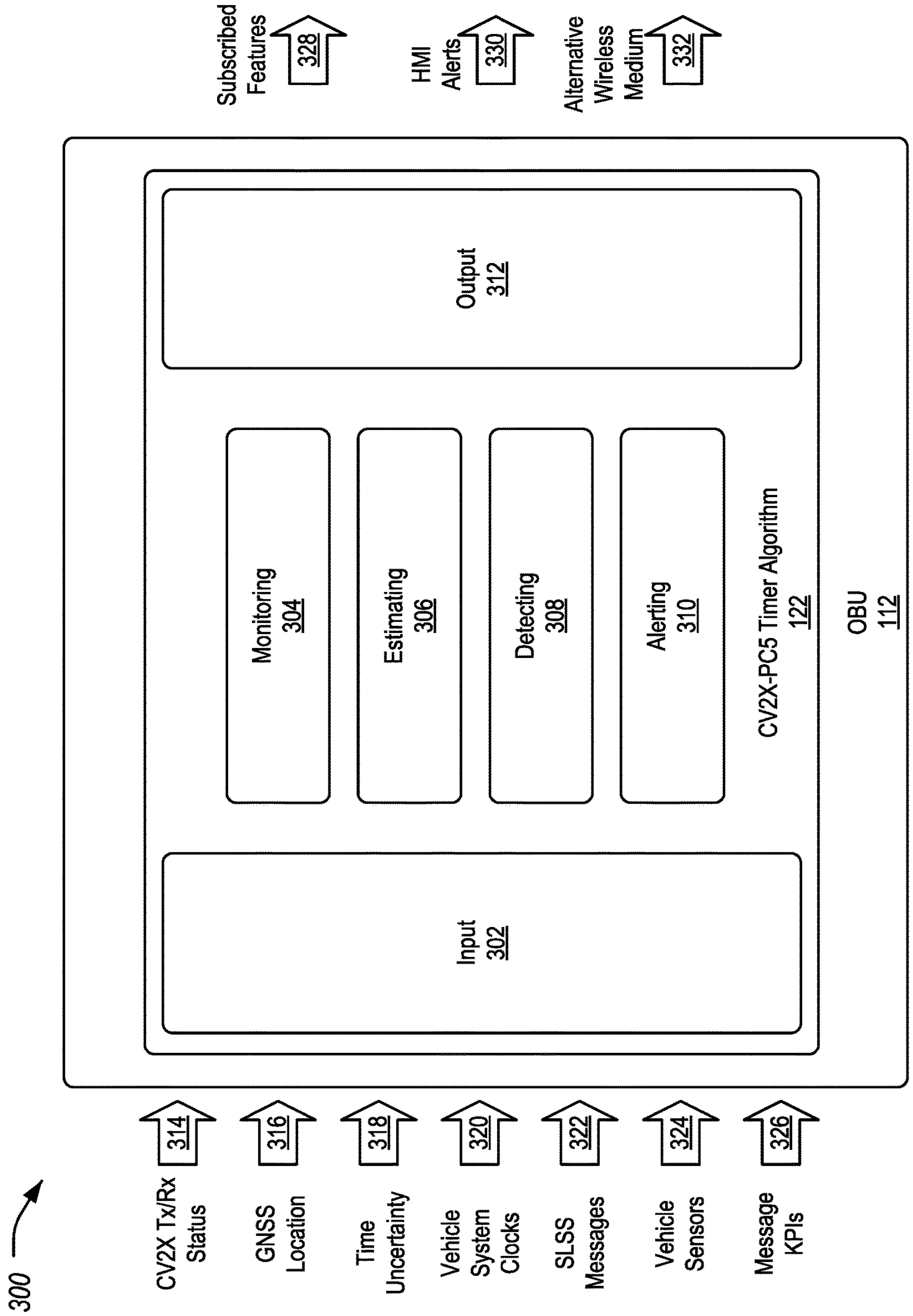
FIG. 3 illustrates a data flow diagram of the operation of the CV2X-PC5 timer algorithm.

FIG. 3 illustrates a data flow diagram 300 of the operation of the CV2X-PC5 timer algorithm 122. The CV2X-PC5 timer algorithm 122 may predict a loss of time synchronization. This may be used to address effects of the loss of the time synchronization on transmission and reception of any CV2X-PC5 messages from and to the vehicles 102. Based on the inputs, the CV2X-PC5 timer algorithm 122 may serve as a platform feature supporting timing for the various CV2X-PC5 features of the vehicle 102. The CV2X-PC5 timer algorithm 122 may be used to perform monitoring, detecting, estimating, and alerting of CV2X-PC5 operation status. As shown, the CV2X-PC5 timer algorithm 122 may include an input component 302, a monitoring component 304, a detecting component 306, an estimating component 308, an alerting component 310, and an output component 312. It should be noted that this is only an example, and a different modularization of the functionality of the CV2X-PC5 timer algorithm 122 may be used.

The input component 302 may be configured to receive various inputs. These inputs may include including CV2X-PC5 message transmission/reception status 314 as identified from the transceiver 118. This information may include state data indicative of the CV2X-PC5 state of the vehicle 102 as well as time uncertainty identified from the received and transmitted CV2X-PC5 messages. The inputs may also include GNSS location 316 of the vehicle 102 as determined using the GNSS controller 110. These inputs may include, e.g., semi major axis accuracy, semi minor axis accuracy, time confidence, number of satellites available, number of satellites being used, whether repeaters were in use, etc. The inputs may also include time uncertainty 318. This may be identified, e.g., from received and transmitted CV2X-PC5 messages. The inputs may also include vehicle system clocks 320. This may include, e.g., system clock time of various controllers of the vehicle 102, clock drift time, gPTP reported values, etc. The inputs may also include SLSS messages 322. This may include, e.g., reception of the SLSS message 322 from one or more CV2X-PC5 RSUs 128. The inputs may also include sensor data 324 from vehicle sensors 114. This may include images from cameras, 3D data or point clouds from LIDAR, etc. The input may also include key performance indicator (KPI) data 326 from CV2X-PC5 messages. This may include, for example, IPG, PER, RSSI, etc. The input component 302 may capture these inputs and buffer and synchronize them for use by the other operations of the CV2X-PC5 timer algorithm 122.

The monitoring component 304 may include monitoring the inputs via both dynamic and static data rate intervals using a feedback loop system. In an example, the monitoring component 304 may monitor the inputs via the input component 302 using either a dynamic data rate interval or a static data rate interval, based on a feedback loop system determined by the detecting component 306. For example, if the SemiMajorAxisAccuracy is inaccurate beyond a threshold value, if the SemiMinorAxisAccuracy is inaccurate beyond a threshold value, and/or if the GNSSTimeConfidence is less than a threshold value, then a dynamic data rate may be set for the monitoring. Otherwise, a static rate may be used for the monitoring. As used herein, the static rate may refer to a rate having a fixed frequency, such as 1 hz, while the dynamic rate may refer to a slower and/or variable rate with a frequency such as 10 hz (but other rates are possible). The dynamic rate may offer more data rate points for the timer algorithm to choose from, allowing for flexibility in the processing update rate.

The detecting component 306 may detect whether time synchronization over a defined threshold of samples falls below the 391 ns threshold, or whether the time synchronization has begun to drift closer to the 391 ns threshold and beyond via predefined conditions. Based on this determination, the detecting component 306 may inform the monitoring component 304 whether to use the static rate or the dynamic rate. One of the key data element to check for drift is the time uncertainty value. The time uncertainty may be received from CV2X-PC5 radio module itself. The detecting component 306 may perform operations as shown in the following pseudocode:

```
// PERFORM UPDATE AND DETECTION
CV2X-PC5_status = UpdateStatus( );
// CONDITION 1
if (CV2X-PC5_status >= Threshold_State || // e.g., Active
  vehicle_sensors_flag == true)
{
  if (GNSS_numberOfSatellites > 0 &&
  GNSS_numberOfSatellitesUsed > 0)
  {
    if (GNSS_SemiMajorAxisAccuracy >=
    conf(GNSS_setting_val) &&
        GNSS_SemiMinorAxisAccuracy >=
        conf(GNSS_setting_val) &&
        GNSS_TimeConfidence <= 1msec)
    {
      set_monitor_flag = dynamic_data_rate;
    }
  }
}
elseif (CV2X-PC5_status <= Threshold_State || // e.g., Inactive
  vehicle_sensors_flag == false)
{
  set_monitor_flag = static_data_rate;
  alert_timer_module == false;
}
```

-continued

```
// CONDITION 2
if (set_monitor_flag == dynamic_data_rate)
{
  if (vehicle_system_module_drifttime >= 100usec)
  {
    if (time_uncertainty >= 390nsec)
    {
      check_slss_message_reception( );
      timer_estimation = true;
    }
    elseif (time_uncertainty <= 390nsec)
    {
      set_monitor_flag = static-data-rate;
      timer_estimation = false;
    }
  }
}
```

The CV2X-PC5_status values may be calculated based on threshold states, which may include Unknown, Active, and Inactive. If the threshold state indicates that the status is at least at an Active threshold, then the first if for condition 1 may be satisfied, while if the threshold state indicates that the status is Inactive, then the else if may be satisfied.

The GNSS_setting_value may be configurable to adjust the confidence number it compares. For example: a first predetermined value may be configured as a first confidence value, e.g., 68% of output values lies inside and remaining 32% lies outside, while a second predetermined value may be configured as a second confidence value, e.g., 35% lies outside.

If alert_timer_module is set to false, then no timer alert is raised, meaning the V2X functionality is working as expected within operational conditions.

Regarding vehicle_system_module_drifttime, this is a time reported by the system time of the vehicle 102. The system time of the vehicle 102 may reports the drift time from a current time and using previous time hysterics for a predefined period of trailing sample points (e.g., 10 sample points), e.g., when compared to the UTC 1-msec time interval value.

The Timer_Estimation is used to indicate whether to perform a training regression or not. If this value is set to true, then the training regression algorithm is performed. If it set to false, the training regression algorithm is not performed.

The check_slss_message_reception may validate received message data upon reception of SLSS messages over CV2X-PC5. The SLSS messages are broadcast by the RSU infrastructure every 100 msec and may be accordingly be received by the vehicle 102 every 100-msec. If SLSS messages are not received, then vehicle 102 proceeds to condition 1 of the GNSS checks.

The estimating component 308 may perform regression estimation training instantaneously for early prediction of potential time synchronization issues, based on the detecting of such a time synchronization condition for a predefined duration. The estimation may be performed as shown in the following pseudocode:

```
// PERFORM ESTIMATION
if (timer_estimation == true)
{
  is_slss_message_reception_data_valid =
    ValidateSLSSMessageReceptionData( );
  if (is_slss_message_reception_data_valid)
  {
    alert_timer_module(level, confidence) =
      function_of_estimation_training_regression(
        time-uncertainty, slss_msg,        // Example
        CV2X-PC5 status, gnss_data,        // regression
        IPG, PER, RSSI);                   // inputs
  }
  else // is_slss_message_reception_data_valid is false
  {
    alert_timer_module(level, confidence) = true;
  }
}
```

It should be noted that while the pseudo code is similar or identical in either branch of the if, the functionality depends on the alert_timer_module being true rather than false. For instance, it may be the subscribed CV2X-PC5 features to determine whether they need to verify the contents at every 100 msec iteration, which may vary based on whether alert_timer_module is true or false.

The slss_message_reception_data_valid field checks for the slss message data content received, e.g., every 10 msec. If the content satisfies various requirements (such as physical level validity), then the data may be considered to be valid. Some example data element and parameters to be confirmed include whether the SLSS message has a sync source (e.g., eNB, RSU, GNSS, etc.), congestion for data rate and signal strength, transmission rate for CV2X-PC5 (e.g., SPS or Event Based), time synchronization etc.

The function_of_estimation_training_regression refers to an AI-trained neural networking training model which performs the operation based on the inputs, and provides output in the form of a level and a confidence. The confidence may be classified under various categories, one example set of five categories may include 50%, 68%, 95%, 99%, 99.9%. The levels may be classified under various levels, one example set of three levels may include Level-0, Level-1, Level-2, with Level-0 being low and Level-2 being High. When the level and confidence are both combined, this may alert the respective subscribed functions of which what level and confidence the respective entity should utilize them based on timer output algorithm. If level is 2 and confidence is 99.9%; then its highest level and confidence the entity can be used to trust the timer output algorithm.

If an issue is identified, the alerting component 310 may alert any CV2X-PC5 features subscribed to this CV2X-PC5 timer feature output. For example, the features of the vehicle 102 may subscribe to receive timing information from the CV2X-PC5 timer algorithm 122, and the CV2X-PC5 timer algorithm 122 may send updates to the subscribed features 328. This may allow the subscribed features 328 to be informed of drift or other timing issues. The alerting component 310 may also update message time uncertainty 318, and may provide information for HMI alerts 330 and/or use of an alternate wireless communication medium 332.

The alerting may be performed as shown in the following pseudocode:

```
// PERFORM ALERTING
if (alert_timer_module) // alert_timer_module is true
{
  cv2x_pc5_features = (level, confidence);
  cv2x_pc5_messages_time_uncertainty_Tx = (level, confidence);
  alternate_wireless_comm = (level, confidence);
  vehicle_HMI_timer = (level, confidence);
}
else // No alert
{
  cv2x_pc5_features = (level, confidence);
  cv2x_pc5_messages_time_uncertainty_Tx = (level, confidence);
  alternate_wireless_comm = (level, confidence);
  vehicle_HMI_timer = (level, confidence);
}
```

The function_of_estimation_training_regression refers to an AI-trained neural networking training model which performs the operation based on the inputs, and provides output in the form of a level and a confidence. The confidence may be classified under various categories, one example set of five categories may include 50%, 68%, 95%, 99%, 99.9%. The levels may be classified under various levels, one example set of three levels may include Level-0, Level-1, Level-2, with Level-0 being low and Level-2 being High. When the level and confidence are both combined, this may alert the respective subscribed functions of which what level and confidence the respective entity should utilize them based on timer output algorithm. If level is 2 and confidence is 99.9%; then its highest level and confidence the entity can be used to trust the timer output algorithm.

The output component 312 may aid the CV2X-PC5 features in providing the outputs relating to the timing to the subscribed features 328. The subscribed CV2X-PC5 features may use the alerts trigger to plan ahead for a potential loss of CV2X-PC5 messaging and/or to inform the vehicle customer of the respective feature of the potential feature unavailability.

The output component 312 may also provide the HMI alerts 330 to a user if a timing issue is identified. In an example, the output component 312 may trigger and display a CV2X-PC5 wireless connectivity status on the HMI of the vehicle 102. For instance, the HMI alerts 330 may be provided by the output component 312 to the infotainment controller 108 for display to the HMI of the vehicle 102. The HMI alerts 330 may indicate that there are issues with time synchronization of wireless messages. Additionally or alternatively, the HMI alerts 330 may indicate that the subscribed features 328 may operate with reduced effectiveness or may be inoperable. In one example the HMI alerts 330 may include a listing of the features that are affected.

The output component 312 may also suggest use of the alternate wireless communication medium 332 (e.g., a connection through the user's phone, a connection to Wi-Fi, a connection via another local vehicle 102, etc.) to allow the CV2X-PC5 features to continue despite the lack of synchronization.

The CV2X-PC5 timer algorithm 122 may also differentiate the GNSS reception received over the GNSS repeaters 210 vs real GNSS satellites 208 and may inform the respective CV2X-PC5 features of repeater-specific potential synchronization issues. This information may be provided to the subscribed features 328 and/or may be shown in the HMI alerts 330.

The confidence levels (e.g., from low to high) may also be encoded and included in the C-V2X-PC5 messages being broadcast to inform other participants of the level of synchronization of the ego vehicle 102. This confidence level may, in turn, be used by remote vehicles 102 running the same algorithm in estimating synchronization state in the future. The AVM server 206 may also receive this message and create a map of the synchronization level of the participating vehicles 102, which can help with predicting possible signal outages due to the loss of synchronization. In another example, alerts may be raised to the vehicles 102 of clustered locations where loss of synchronization occurs (e.g., to allow the vehicles 102 to preemptively adjust to another wireless protocol), and/or to allow network operators to investigate the location (e.g., to repair equipment, to add an additional cell to the network, etc.).

Figure 4:
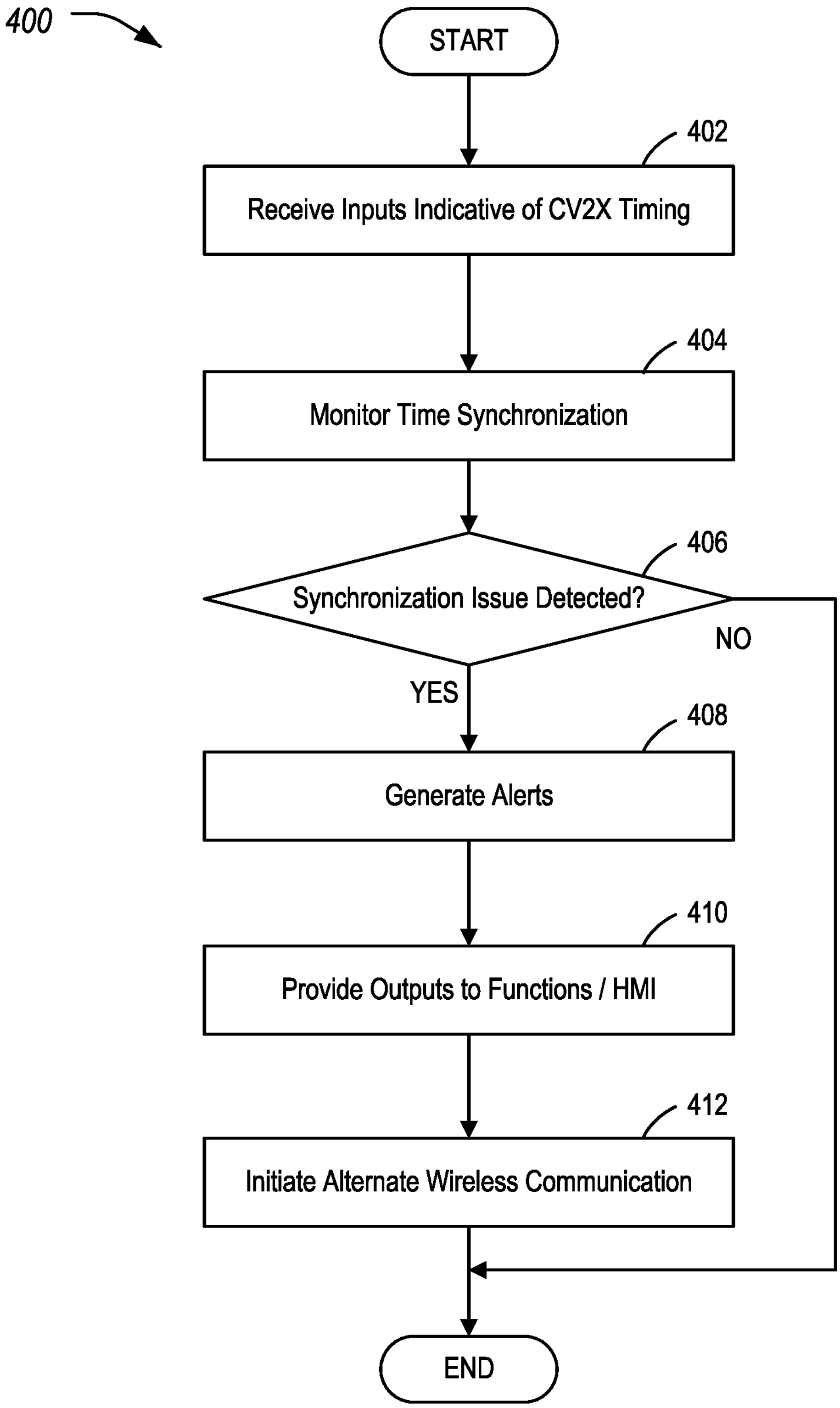
FIG. 4 illustrates an example process for the operation of the CV2X-PC5 timer algorithm.

FIG. 4 illustrates an example process 400 for the operation of the CV2X-PC5 timer algorithm 122. In an example, the process 400 may be performed by the OBU 112 executing the operations of the CV2X-PC5 timer algorithm 122 as discussed in detail herein.

At operation 402, the OBU 112 receives inputs indicative of CV2X timing. These inputs may be received to the input component 302 of the CV2X-PC5 timer algorithm 122. In an example, the inputs may include CV2X-PC5 message transmission/reception status 314 as identified from the transceiver 118; the GNSS location 316 of the vehicle 102 as determined using the GNSS controller 110; time uncertainty 318 identified, e.g., from received and transmitted CV2X-PC5 messages; include vehicle system clocks 320 of various controllers of the vehicle 102; SLSS messages 322; sensor data 324 from vehicle sensors 114 and/or KPI data 326 from CV2X-PC5 messages. The input component 302 may capture these inputs and buffer and synchronize them for use by the other operations of the CV2X-PC5 timer algorithm 122.

At operation 404, the OBU 112 monitors time synchronization of the received inputs. In an example, the monitoring component 304 may monitor the inputs via the input component 302 using either a dynamic data rate interval or a static data rate interval, based on a feedback loop system determined by the detecting component 306. For example, if the SemiMajorAxisAccuracy is inaccurate beyond a threshold value, if the SemiMinorAxisAccuracy is inaccurate beyond a threshold value, and/or if the GNSSTimeConfidence is less than a threshold value, then a dynamic data rate may be set for the monitoring. Otherwise, a static rate may be used for the monitoring. Moreover, the detecting component 306 may detect whether time synchronization over a defined threshold of samples falls below the 391 ns threshold, or whether the time synchronization has begun to drift closer to the 391 ns threshold and beyond via predefined conditions. Based on this determination, the detecting component 306 may inform the monitoring component 304 whether to use the static rate or the dynamic rate.

At operation 406, the OBU 112 determines whether a synchronization issue is detected. In an example, the estimating component 308 may perform regression estimation training instantaneously for early prediction of potential time synchronization issues, based on the detecting of a time synchronization condition for a predefined duration. If a synchronization issue is detected, control passes to operation 408. If not, the process 400 ends.

At operation 408, the OBU 112 generates alerts based on the synchronization issue. In an example, the alerting component 310 may alert any CV2X-PC5 features subscribed to this CV2X-PC5 timer feature output. For example, the features of the vehicle 102 may subscribe to receive timing information from the CV2X-PC5 timer algorithm 122, and the CV2X-PC5 timer algorithm 122 may send updates to the subscribed features 328. This may allow the subscribed features 328 to be informed of drift or other timing issues. The alerting component 310 may also update message time uncertainty 318, and may provide information for HMI alerts 330 and/or use of an alternate wireless communication medium 332.

At operation 410, the OBU 112 provides outputs to subscribed features 328 and/or HMI alerts 330. In an example, the alerting component 310 may inform the output component 312, which may indicate the condition to subscribed features 328 and/or send the HMI alerts 330 for display to the user.

At operation 412, the OBU 112 provides updates the subscribed features 328 to utilize an alternate wireless communication medium 332. In an example, the alerting component 310 may message the alternate wireless communication medium 332 to take over messages to allow for the subscribed features 328 to continue to function despite the identified synchronization issue. After operation 412, the process 400 ends.

Figure 5:
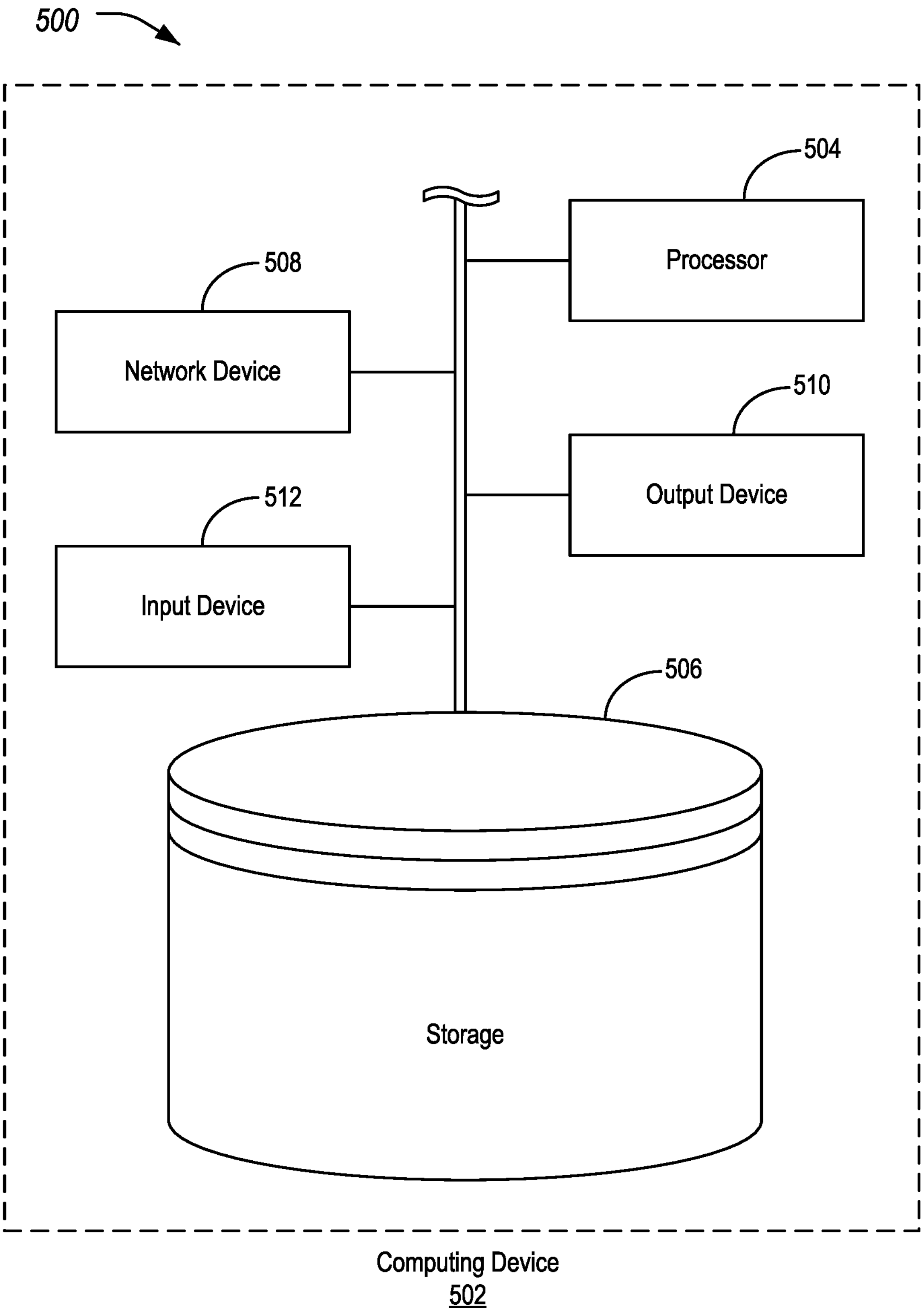
FIG. 5 illustrates an example computing device supporting the operation of the CV2X-PC5 timer algorithm.

FIG. 5 illustrates an example computing device supporting the operation of the CV2X-PC5 timer algorithm 122. Referring to FIG. 5, and with reference to FIGS. 1-4, the vehicles 102, TCUs 104, gateway controllers 106, infotainment controllers 108, GNSS controllers 110, OBUs 112, vehicle sensors 114, transceivers 118, infrastructure elements 124, MECs 126, RSUs 128, traffic controls 130, infrastructure sensors 132, vehicle manufacturing clouds 134, vehicle delivery manager clouds 136, dealerships 138, insurance agencies 140, rental agencies 142, valet parking 144, vehicle customer web portal clouds 146, user devices 148, detecting components 306, GNSS satellites 208, GNSS repeaters 210, etc., may be examples of such computing devices 502. Computing devices 502 generally include computer-executable instructions, such as those of the PC5 timer algorithm 122, where the instructions may be executable by one or more computing devices 502. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices 512 that receive human interface inputs may include keyboards, mice, trackballs, touchscreens, microphones, graphics tablets, and the like.

The network devices 508 may each include any of various devices that enable the described components to send and/or receive data from external devices over networks. Examples of suitable network devices 508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for monitoring, detecting, estimating, and alerting cellular vehicle-to-everything PC5 (CV2X-PC5) operation status of a vehicle, comprising:

receiving inputs indicative of message timing of messages over CV2X-PC5, the messages being used for one or more subscribed vehicle features;

monitoring time synchronization of the received inputs;

determining whether a synchronization issue is detected, including performing regression estimation on the received inputs to generate, as an output of the regression estimation, a predicted level of time synchronization and a confidence in the predicted level, for early prediction of potential time synchronization issues; and responsive to occurrence of the synchronization issue, utilizing an alternate wireless communication medium of the vehicle to mitigate effects of the synchronization issue on the one or more subscribed vehicle features.

2. The method of claim 1, further comprising informing the one or more subscribed vehicle features of the synchronization issue.

3. The method of claim 1, further comprising indicating the synchronization issue via human-machine interface (HMI) alerts to be provided to a user of the vehicle.

4. The method of claim 1, wherein the inputs include one or more of:

CV2X-PC5 message transmission/reception status as identified from a transceiver of the vehicle;

state data indicative of a CV2X-PC5 state of the vehicle;

global navigation satellite system (GNSS) location of the vehicle as determined using a GNSS controller of the vehicle;

time uncertainty as identified from CV2X-PC5 messages sent by or received to the vehicle;

vehicle system clocks of one or more controllers of the vehicle;

sidelink synchronization signal (SLSS) messages received by the vehicle from one or more CV2X-PC5 road-side units (RSUs);

sensor data from vehicle sensors; or key performance indicator (KPI) data from the CV2X-PC5 messages.

5. The method of claim 1, wherein the monitoring switches between a static rate or a dynamic rate based on one or more of SemiMajorAxisAccuracy accuracy, SemiMinorAxisAccuracy accuracy, or GNSSTimeConfidence.

6. The method of claim 1, wherein the regression estimation is performed by a neural network trained on the inputs indicative of the message timing of messages to provide the output indicating the predicted level of time synchronization and the confidence in the level, wherein the level and confidence values are provided to the one or more subscribed vehicle features to allow the one or more subscribed vehicle features to adapt based on the level of time synchronization and the confidence in the level.

7. The method of claim 1, wherein the potential time synchronization issues include that the time synchronization has begun to drift closer to a maximum tolerance before the time synchronization has exceeded the maximum tolerance.

8. A system for monitoring, detecting, estimating, and alerting cellular vehicle-to-everything PC5 (CV2X-PC5) operation status of a vehicle, comprising:

one or more computing devices configured to:

receive inputs indicative of message timing of messages over CV2X-PC5, the messages being used for one or more subscribed vehicle features;

monitor time synchronization of the received inputs;

determine whether a synchronization issue is detected, including performing regression estimation on the received inputs to generate, as an output of the regression estimation, a predicted level of time synchronization and a confidence in the predicted level, for early prediction of potential time synchronization issues; and responsive to occurrence of the synchronization issue, utilize an alternate wireless communication medium of the vehicle to mitigate effects of the synchronization issue on the one or more subscribed vehicle features.

9. The system of claim 8, wherein the one or more computing devices are further configured to inform the one or more subscribed vehicle features of the synchronization issue.

10. The system of claim 8, wherein the one or more computing devices are further configured to indicate the synchronization issue via human-machine interface (HMI) alerts to be provided to a user of the vehicle.

11. The system of claim 8, wherein the inputs include one or more of:

CV2X-PC5 message transmission/reception status as identified from a transceiver of the vehicle;

state data indicative of a CV2X-PC5 state of the vehicle;

global navigation satellite system (GNSS) location of the vehicle as determined using a GNSS controller of the vehicle;

time uncertainty as identified from CV2X-PC5 messages sent by or received to the vehicle;

vehicle system clocks of one or more controllers of the vehicle;

sidelink synchronization signal (SLSS) messages received by the vehicle from one or more CV2X-PC5 road-side units (RSUs);

sensor data from vehicle sensors; or key performance indicator (KPI) data from the CV2X-PC5 messages.

12. The system of claim 8, wherein the monitoring switches between a static rate or a dynamic rate based on one or more of SemiMajorAxisAccuracy accuracy, SemiMinorAxisAccuracy accuracy, or GNSSTimeConfidence.

13. The system of claim 8, wherein the regression estimation is performed by a neural network trained on the inputs indicative of the message timing of messages to provide the output indicating the predicted a-level of time synchronization and the confidence in the level, wherein the level and confidence values are provided to the one or more subscribed vehicle features to allow the one or more subscribed vehicle features to adapt based on the level of time synchronization and the confidence in the level.

14. The system of claim 8, wherein the potential time synchronization issues include that the time synchronization has begun to drift closer to a maximum tolerance before the time synchronization has exceeded the maximum tolerance.

15. A non-transitory computer-readable medium comprising instructions for monitoring, detecting, estimating, and alerting cellular vehicle-to-everything PC5 (CV2X-PC5) operation status of a vehicle that, when executed by one or more computing devices of the vehicle, cause the vehicle to perform operations including to:

receive inputs indicative of message timing of messages over CV2X-PC5, the messages being used for one or more subscribed vehicle features;

monitor time synchronization of the received inputs;

determine whether a synchronization issue is detected, including performing regression estimation on the received inputs to generate, as an output of the regression estimation, a predicted level of time synchronization and a confidence in the predicted level, for early prediction of potential time synchronization issues; and responsive to occurrence of the synchronization issue, utilize an alternate wireless communication medium of the vehicle to mitigate effects of the synchronization issue on the one or more subscribed vehicle features.

16. The non-transitory computer-readable medium of claim 15, further comprising instructions that when executed by the one or more computing devices cause the vehicle to perform operations including to inform the one or more subscribed vehicle features of the synchronization issue.

17. The non-transitory computer-readable medium of claim 15, further comprising instructions that when executed by the one or more computing devices cause the vehicle to perform operations including to indicate the synchronization issue via human-machine interface (HMI) alerts to be provided to a user of the vehicle.

18. The non-transitory computer-readable medium of claim 15, wherein the inputs include one or more of:

CV2X-PC5 message transmission/reception status as identified from a transceiver of the vehicle;

state data indicative of a CV2X-PC5 state of the vehicle;

global navigation satellite system (GNSS) location of the vehicle as determined using a GNSS controller of the vehicle;

time uncertainty as identified from CV2X-PC5 messages sent by or received to the vehicle;

vehicle system clocks of one or more controllers of the vehicle;

sidelink synchronization signal (SLSS) messages received by the vehicle from one or more CV2X-PC5 road-side units (RSUs);

sensor data from vehicle sensors; or key performance indicator (KPI) data from the CV2X-PC5 messages.

19. The non-transitory computer-readable medium of claim 15, wherein the monitoring switches between a static rate or a dynamic rate based on one or more of SemiMajorAxisAccuracy accuracy, SemiMinorAxisAccuracy accuracy, or GNSSTimeConfidence.

20. The non-transitory computer-readable medium of claim 15, wherein the regression estimation is performed by a neural network trained based on the inputs indicative of the message timing of messages to provide the output indicating the level of time synchronization and the confidence in the level, wherein the level and confidence values are provided to the one or more subscribed vehicle features to allow the one or more subscribed vehicle features to adapt based on the level of time synchronization and the confidence in the level, and the potential time synchronization issues include that the time synchronization has begun to drift closer to a maximum tolerance before the time synchronization has exceeded the maximum tolerance.

* * * * *